United States Patent
Lowe et al.

(10) Patent No.: US 6,233,221 B1
(45) Date of Patent: May 15, 2001

(54) SYSTEM AND METHOD FOR A RING NETWORK WITH VIRTUAL PATH CONNECTIONS

(75) Inventors: Gregory D. Lowe, Dallas; Dan Zheng, Plano, both of TX (US)

(73) Assignee: ADC Telecommunications, Inc., Minnetonka, MN (US)

( * ) Notice: Subject to any disclaimer, the term of this patent is extended or adjusted under 35 U.S.C. 154(b) by 0 days.

(21) Appl. No.: 09/027,156

(22) Filed: Feb. 20, 1998

(51) Int. Cl.[7] ................................ H04N 1/16; H04J 3/04
(52) U.S. Cl. ............................................. 370/222; 370/535
(58) Field of Search ...................... 370/222, 223, 370/224, 249, 460, 466, 225, 228, 535, 542; 714/716, 717; 340/825.01, 827

(56) References Cited

U.S. PATENT DOCUMENTS

| | | | |
|---|---|---|---|
| 4,677,611 | * 6/1987 | Yanosy, Jr. et al. | 370/401 |
| 5,070,498 | 12/1991 | Kakuma et al. | 370/60 |
| 5,280,475 | 1/1994 | Yanagi et al. | 370/60 |
| 5,390,164 | * 2/1995 | Kremer | 370/223 |
| 5,394,389 | * 2/1995 | Kremer | 370/223 |
| 5,515,363 | 5/1996 | Ben-Nun et al. | 370/17 |
| 5,537,411 | * 7/1996 | Plas | 370/397 |
| 5,557,611 | 9/1996 | Cappellari et al. | 370/60.1 |
| 5,583,849 | * 12/1996 | Ziemann et al. | 370/397 |
| 5,612,959 | 3/1997 | Takase et al. | 370/390 |
| 5,636,215 | * 6/1997 | Kubo et al. | 370/397 |
| 5,673,262 | 9/1997 | Shimizu | 370/395 |
| 5,684,800 | 11/1997 | Dobbins et al. | 370/401 |
| 5,754,528 | * 5/1998 | Uchida | 370/222 |
| 5,774,662 | 6/1998 | Sakagawa | 395/200.33 |
| 5,805,820 | 9/1998 | Bellovin et al. | 395/200.55 |
| 5,838,663 | 11/1998 | Elwalid et al. | 370/233 |
| 5,852,606 | 12/1998 | Prince et al. | 370/393 |
| 5,892,912 | 4/1999 | Suzuki et al. | 395/200.48 |
| 5,912,891 | 6/1999 | Kanai | 370/395 |
| 5,978,356 | 11/1999 | Elwalid et al. | 370/230 |

FOREIGN PATENT DOCUMENTS 0818940  1/1998 (EP) .............................. H04Q/11/14

OTHER PUBLICATIONS

"ATM Service Access Multiplexer (SAM) Generic Requirements", GR–2842–Core, Issue 2, (Nov. 1996).
"ATM Virtual Path Functionality in SONET Rings—Generic Criteria", Bellcore Standard GR–2837–Core, Issue 3, (Oct. 1996).
Fritz, J., "bulletproofing ATM: Part 1", Byte, 22, 59–60, (Jun. 1, 1997).
May, K.P., et al., "A Fast Restoration System for ATM–ring–based LANS", *IEEE Communications Magazine, 33*, 90–98, (Sep. 1995).
Takase, A., et al., "ATM Transport Node for Flexible and Robust Access Networks", Proceedings of the Global Telecommunications Conference (GLOBECOM), vol. 3, Houston, TX, 1481–1487, (Nov. 29–Dec. 2, 1993).

* cited by examiner

Primary Examiner—David R. Vincent
(74) Attorney, Agent, or Firm—Fogg Slifer & Polglaze, PA

(57) ABSTRACT

A network element for a virtual path ring network is provided. The network element includes a first ring interface module with a ring input and a ring output. Further, the network element includes a second ring interface module with a ring input and a ring output. A first bus is coupled to the first ring interface. A second bus is coupled to the second ring interface. The first and second ring interface modules each include a switch fabric that passes packets from the ring input of the interface module to its ring output for packets with a destination address for an endpoint associated with another network element. The switch fabrics of the first and second ring interfaces further pass packets from the ring input to the first and second buses, respectively, for packets with destination addresses for endpoints that are associated with the network element. An access interface module is coupled to the first and second buses that adds and drops traffic to and from the ring network.

18 Claims, 3 Drawing Sheets

SYSTEM AND METHOD FOR A RING NETWORK WITH VIRTUAL PATH CONNECTIONS

TECHNICAL FIELD OF THE INVENTION

The present invention relates generally to the field of telecommunications and, in particular, to a system and method for a ring network with virtual path connections.

BACKGROUND OF THE INVENTION

The telecommunications industry traditionally has provided services to subscribers over narrowband circuits. These narrowband circuits provided acceptable performance when the bulk of the demand for telecommunications services was predominantly for voice traffic. In recent years, additional telecommunications services have been developed that can use much higher bandwidth, e.g., Internet access, video conferencing, corporate intranets. These "broadband" services are increasingly in demand. Unfortunately, the existing telecommunications networks are not designed to provide quality broadband services.

As the demand for access to telecommunications services increased, the industry used time division multiplexing technology to aggregate a number of lower bandwidth circuits onto higher bandwidth circuits. By the middle 1980's, the SONET standard was well established as a time division multiplexing technology for fiber optic transport systems. However, as anyone who has attempted to download a large data file over the Internet can attest, current broadband services do not operate well over the existing telecommunications infrastructure.

The telecommunications industry has been developing approaches that will allow better use of bandwidth in a broadband network. For example, Bellcore, with the assistance of others in the telecommunications industry, has provided standards for transmitting asynchronous transfer mode (ATM) packets over a SONET ring network. See, e.g., GR-2842 and GR-2837. These standards are incorporated herein by reference. These standards specify transmission of data between endpoints in a ring network over virtual circuits.

However, the standards do not speak to all issues relating to a ring network for carrying ATM traffic. First, the standards do not specify how to prevent a single point of failure from bringing down the network element and the network. Further, the standards do not address how to interconnect two sub-networks so that a single point of failure in one sub-network does not interfere with the operation of the second sub-network.

For the reasons stated above, and for other reasons stated below which will become apparent to those skilled in the art upon reading and understanding the present specification, there is a need in the art for a ring network with virtual connections that survives single point of failure and that can interconnect with other ring networks without interfering with the operation of the other ring networks.

SUMMARY OF THE INVENTION

The above mentioned problems with telecommunications networks and other problems are addressed by the present invention and will be understood by reading and studying the following specification. A system and method for a ring network with virtual path connections is described which uses first and second ring interface modules to process packets on first and second routes of a ring network. The ring interface modules by-pass a local bus at a network element when a packet received from the ring is destined for an endpoint associated with another network element. Further, ring interconnection modules are provided which allow packets from either route of one network to be communicated to a second network such that a point of failure in one route of the first network will not cause path switching in the second network but cause path switching in the ring interconnection module in the first network.

In particular, an illustrative embodiment of the present invention includes a network element for a virtual path ring network. The network element includes a first ring interface module with a ring input and a ring output. Further, the network element includes a second ring interface module with a ring input and a ring output. A first bus is coupled to the first ring interface. A second bus is coupled to the second ring interface. The first and second ring interface modules each include a switch fabric that passes packets from the ring input of the interface module to its ring output for packets with a destination address for an endpoint associated with another network element. The switch fabrics of the first and second ring interfaces further pass packets from the ring input to the first and second buses, respectively, for packets with destination addresses for endpoints that are associated with the network element. An access interface module is coupled to the first and second buses that adds and drops traffic to and from the ring network.

In another embodiment, a method for processing packets in a network element of a virtual path ring network is provided. The method includes receiving packets from the ring. A destination address of the packet is read. The method looks in a routing table for the destination address read from the packet. When the destination address corresponds to an endpoint associated with the network element, the method switches the packet to a bus of the network element. When the destination address corresponds to an endpoint that is not associated with the network element, the method switches the packet back out onto the ring.

In another embodiment, a method for interconnecting at least two virtual path sub-network rings so that a failure in one sub-network does not cause protection switching in another sub-network is provided. The method includes comparing packets from first and second routes of one sub-network with a first interconnection module. Packets from one of the first and second routes are selected based on the comparisons. The selected packets are transmitted to another sub-network for transmission on one of the routes of the other sub-network.

In another embodiment, a virtual connection network with a protected ring interconnection between sub-network rings is provided. The network includes a first sub-network that includes a number of network elements coupled to form a ring including first and second routes for transmitting packets around the sub-network. At least one additional sub-network is also provided. The at least one additional sub-network includes a number of network elements coupled to form another ring also including first and second routes for transmitting packets around the at least one additional sub-network. A first interconnection module is associated with the first sub-network. The first interconnection module selectively passes packets from one of the first and second routes of the first sub-network to the first route of the at least one additional sub-network. Further, the first interconnection module also passes packets from one of the first and second routes of the at least one additional sub-network to the first route of the first sub-network. A second interconnection module is also provided. The second interconnection module is associated with the first sub-network and selectively passes packets from one of the first and second routes of the first sub-network to the second route of the at least one additional sub-network. Further, the second interconnection module passes packets from one of the first and second routes of the at least one additional sub-network to the second route of the first sub-network.

In another embodiment, a virtual path network is provided. the network includes a first sub-network that includes a number of network elements coupled to form a ring including first and second routes for transmitting data around the network. At least one additional sub-network is provided that includes a number of network elements coupled to form another ring also including first and second routes for transmitting data around the network. A first ring interconnection module interconnects the first sub-network with one of the routes of the second sub-network. A second ring interconnection module interconnects the first sub-network with the other route of the second sub-network.

DETAILED DESCRIPTION OF THE INVENTION

In the following detailed description, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
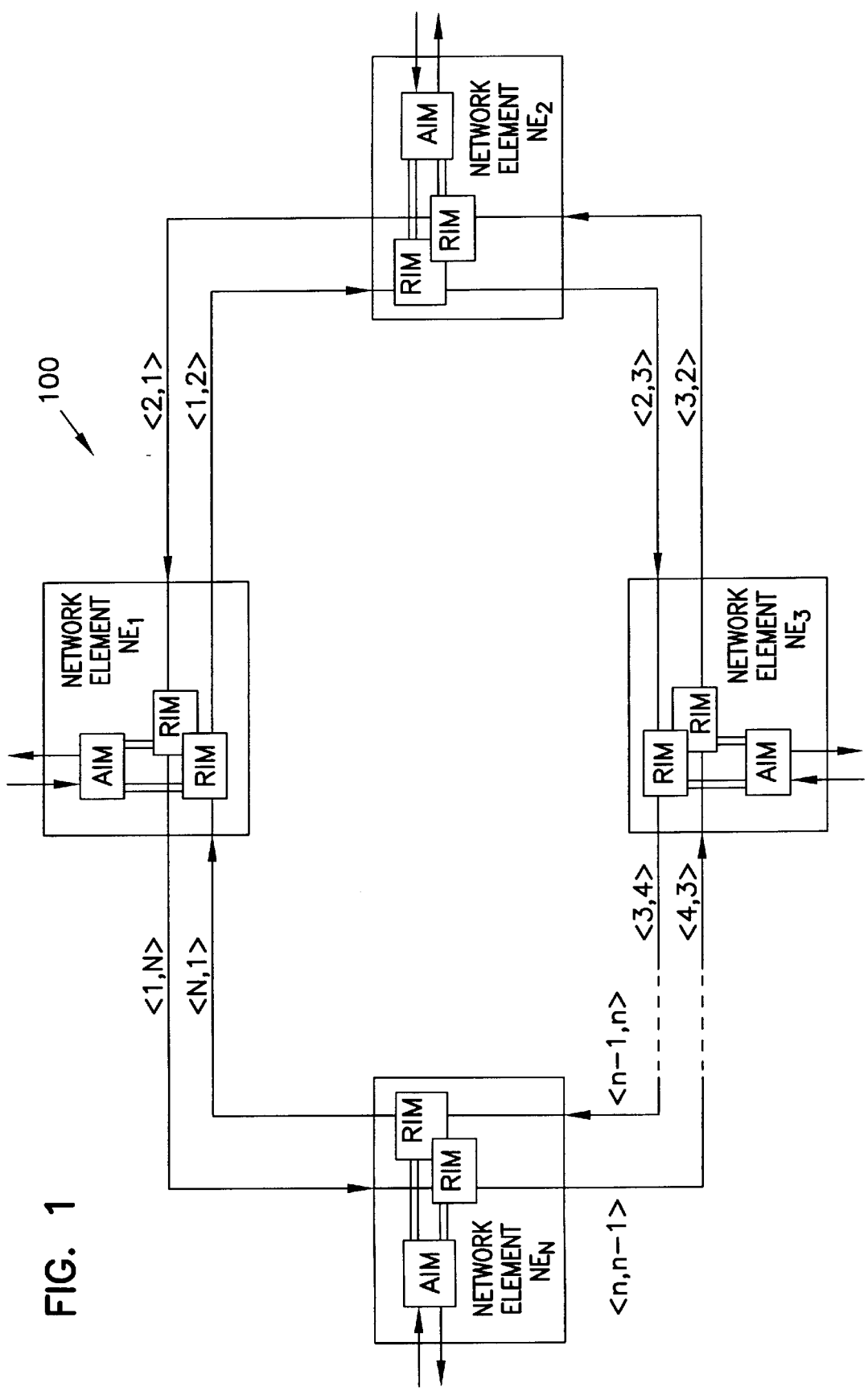
FIG. 1 is a block diagram of an embodiment of a virtual path ring network constructed according to the teachings of the present invention.

FIG. 1 is a block diagram of an illustrative embodiment of the present invention. Network 100 is a closed-loop, ring network including network elements $NE_1$ through $NE_N$. Network 100 transmits packets between endpoints, e.g., terminals, over virtual connections using, for example, asynchronous transfer mode (ATM), frame relay, or any other appropriate virtual connection protocol. Network elements $NE_1$ through $NE_N$ may comprise, for example, virtual connection add/drop multiplexers that operate on the packets.

Network 100 comprises a number of "ring segments." A ring segment is defined as a link that carries data packets or cells in a unidirectional path between two adjacent network elements. Each ring segment in FIG. 1 is denoted by the expression <first network element, second network element> wherein the first network element and the second network element are adjacent network elements in network 100 in the direction of traffic flow around the network. For example, the ring segment connecting network element $NE_1$ to network element $NE_2$ is denoted <1,2>.

Communication over network 100 is accomplished through virtual connections between "endpoints." Each virtual connection begins with a "traffic originating endpoint" and terminates at a "traffic terminating endpoint." The traffic originating endpoint adds traffic or data packets onto network 100 and the traffic terminating endpoint drops the traffic from network 100. There can be many traffic originating endpoints on each network element of ring network 100. It is also noted that each network element supports multiple traffic terminating endpoints.

Network 100 is configured with ring segments that form two routes for transmitting packets or data cells around the ring between endpoints. Advantageously, each virtual connection transmits cells between endpoints on both routes around the ring. In one embodiment, the network elements are configured to transmit cells in opposite directions around the ring. By transmitting cells on both routes, network 100 can carry traffic even when there is an error in one of the routes.

The network elements of network 100 each include two ring interface modules (RIMs) and an access interface module (AIM). Each RIM is coupled to one of the routes of network 100. The AIM provides a point for traffic endpoints to access network 100. The RIMs and the AIM are coupled to at least two data busses typically on the backplane of the network element.

Each RIM processes packets from one of the routes of network 100 as described in more detail below with respect to FIG. 2. Advantageously, when a packet is received by a RIM, the RIM checks the destination address of the packet (e.g., at the ATM level), against an address or routing table to determine whether the packet is destined for an endpoint associated with the network element. When the packet is destined for an endpoint that is not associated with the network element, the RIM switches the packet back out onto the ring without placing the packet on the local bus on the backplane of the network element. Advantageously, this architecture for the network element allows a route of network 100 to continue to transport data packets even when there is a failure in the backplane of any of the network elements by bypassing the backplane of a network element for packets that are destined for another network element.

Figure 2:
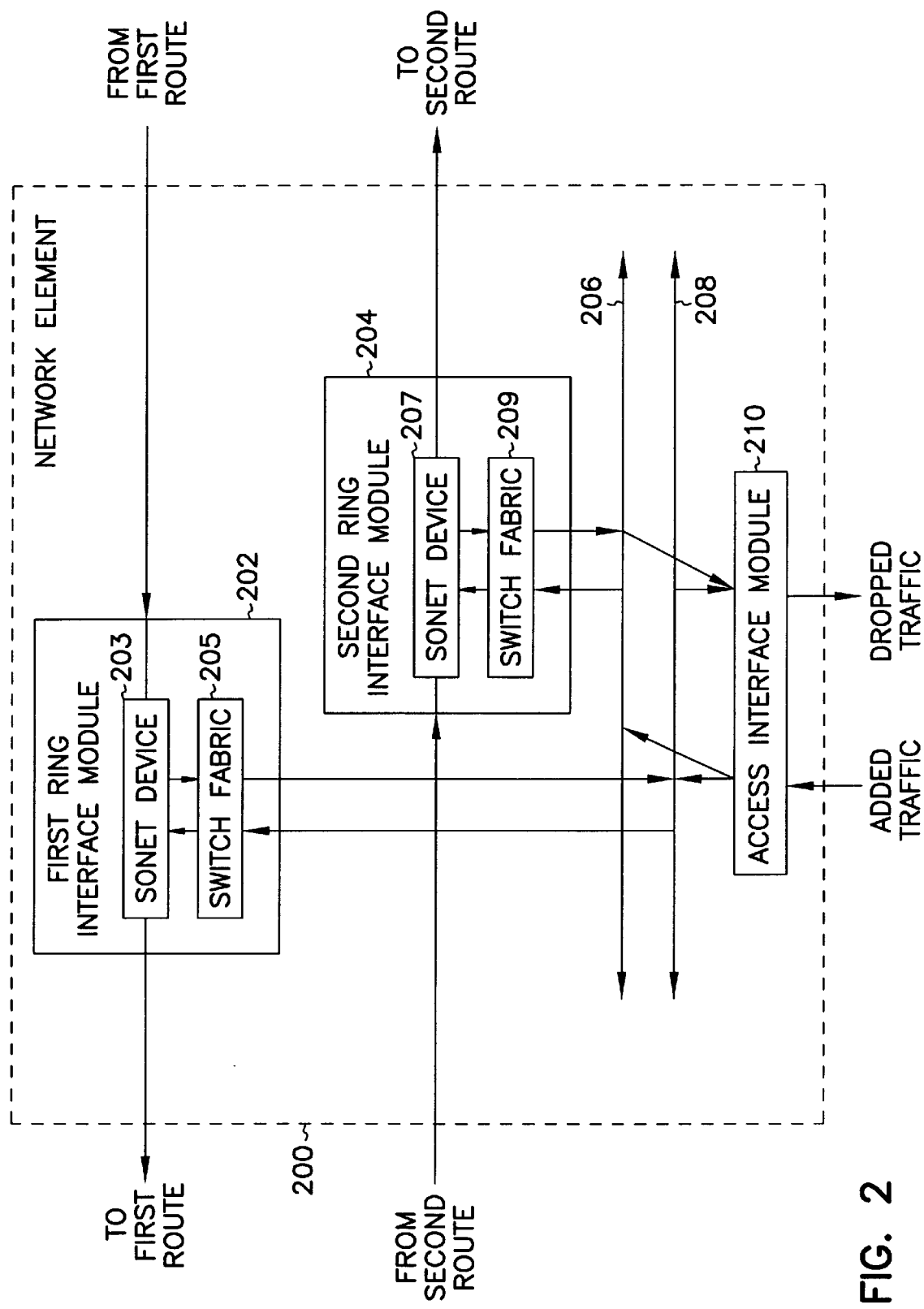
FIG. 2 is a block diagram of an embodiment of a network element for a virtual path network constructed according to the teachings of the present invention.

FIG. 2 is a block diagram of an embodiment of a network element, indicated generally at 200, according to the teachings of the present invention. Network element 200 includes first ring interface module (RIM) 202 and second RIM 204. RIMs 202 and 204 interface with first and second routes of a virtual connection ring network. RIM 202 includes SONET device 203 and switch fabric 205. SONET device 203 is coupled to receive packets from and provide packets to one route of the ring network. SONET device 203 is further coupled to switch fabric 205. Switch fabric 205 is coupled to first bus 208.

Second RIM 204 is constructed similarly to first RIM 202. Second RIM 204 includes SONET device 207 that is coupled to switch fabric 209. Switch fabric 209 is coupled to second bus 206. Access Interface module (AIM) 210 is coupled to first and second busses 208 and 206. In one embodiment, AIM 210 includes a circuit that adapts packets of a first protocol to packets of a second protocol for transmission over the ring network. For example, AIM 210 can adapt Frame Relay or Ethernet packets into ATM cells. Further, AIM 210 includes circuitry to undue the adaptation of packets when network element 200 is the destination network element for a packet.

In operation, SONET device 203 receives packets from the ring network and passes to the switch fabric. The switch fabric determines, from an ATM level address, whether the packet is destined for an endpoint associated with network element 200 or an endpoint associated with another network element of the ring network. When a packet is destined for an endpoint associated with network element 200, switch fabric 205 switches the packet out of RIM 202 and onto local bus 208. AIM 210 then drops the packet from local bus 208 and provides the packet to the appropriate endpoint.

When the packet is destined for an endpoint associated with another network element, switch fabric 205 switches the packet back out onto the ring without placing the packet onto bus 206 or 208. Advantageously, this architecture allows traffic to be carried around the ring network even when there is an error in a bus of any network element.

In another embodiment, network element 200 supports ring-wide multi-casting. To accomplish this, the ring interface modules implement a drop-and-continue function. This means that a packet with a multi-cast address (i.e., the address indicates that the packet is to be transmitted to a group of network elements) is dropped at network element 200 and also is placed back out onto the ring to be forwarded to the next network element.

Figure 3:
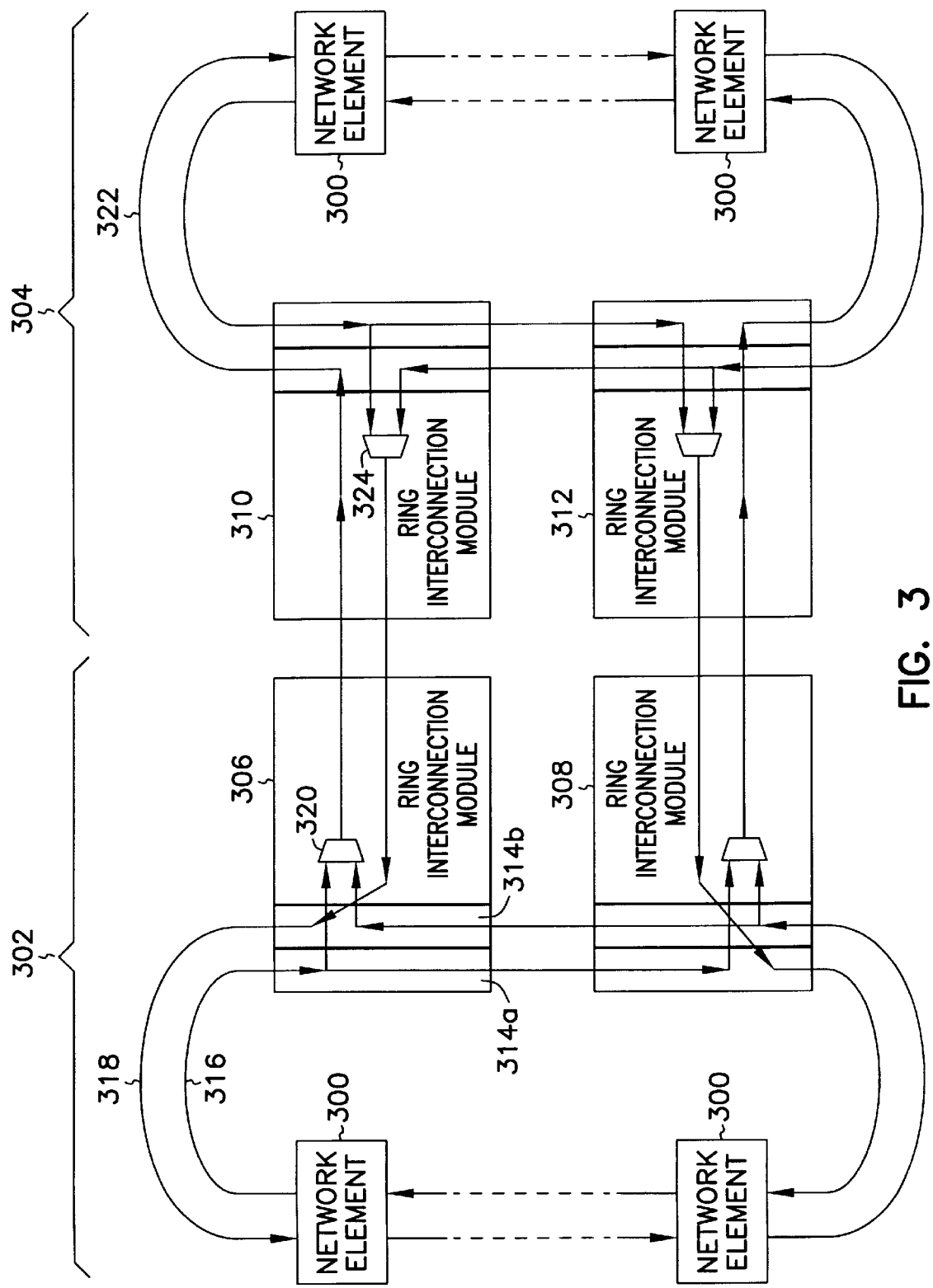
FIG. 3 is a block diagram of an illustrative embodiment of at least two interconnected virtual path ring sub-networks.

FIG. 3 is a block diagram of an illustrative embodiment of the present invention. In this embodiment, first and second virtual path ring sub-networks 302 and 304 are interconnected. Sub-networks 302 and 304 include a number of network elements 300 that form a ring network in a manner similar to network 100 of FIG. 1. Sub-networks 302 and 304 are interconnected through a pair of ring interconnection modules in each sub-network. Sub-network 302 includes ring interconnection modules 306 and 308. Sub-network 304 includes ring interconnection modules 310 and 312.

Essentially, one ring interconnection module in each sub-network compares signals on the two routes of the sub-network and passes the better signal to one route of the other sub-network. The other ring interconnection module performs the same comparison and provides packets to the other route of the other sub-network. Advantageously, packets from the first sub-network are provided to both routes of the second sub-network even if there is an error in one route of the first sub-network since packets from both routes are looked at in determining what to send to each route of the other sub-network. In other words, the ring interconnection modules will provide good packets to each route of the other sub-network so long as one of the routes of the first sub-network is working properly. Thus, equipment or facility failure in one sub-network will not cause path switching in the other sub-network.

Ring interconnection modules 306, 308, 310, and 312 are constructed in a similar manner. Thus, only ring interconnection module 306 is described in detail.

Ring interconnection module 306 includes ring interface modules (RIMs) 314a and 314b that connect ring interconnection module 306 with first and second routes 316 and 318 of sub-network 302, respectively. RIM 314a is coupled to first route 316 and RIM 314b is coupled to second route 318. Ring interconnection module 306 also includes comparator 320. Comparator 320 receives packets from first and second routes 316 and 318 via RIMs 314a and 314b, respectively. RIM 314a drops packets from first route 316 and also forwards the packets to ring interconnection module 308. RIM 314b drops packets from second route 318.

Ring interconnection module 306 includes two connections with ring interconnection module 310 of second sub-network 304—one connection to transmit packets and one connection to receive packets. On one connection, comparator 320 transmits packets to first route 322 of second sub-network 302. Further, on the other connection, ring interconnection module 306 receives packets from comparator 324 of ring interconnection module 310. These packets are placed onto second route 318 of first sub-network 302.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the ring interconnection modules are not limited to use with ring interface modules that include the functionality described with respect to FIG. 2. Specifically, the ring interconnection modules can be used with ring interface modules that drop all traffic onto the local busses of the ring interconnection module. Also, the networks described and claimed are not limited to transport of ATM cells. Other virtual connection technologies can be used as well. It is also noted that a network element can include more than one access interface module.

What is claimed is:

1. An add/drop multiplexer for a virtual path ring network, the add/drop multiplexer comprising:

a first ring interface module with a ring input and a ring output;

a second ring interface module with a ring input and a ring output;

a first bus coupled to the first ring interface;

a second bus coupled to the second ring interface;

wherein the first and second ring interface modules each include a switch fabric that passes packets from the ring input of the interface module to its ring output for packets with a destination address for an endpoint associated with another add/drop multiplexer;

wherein the switch fabrics of the first and second ring interfaces further pass packets from the ring input to the first and second buses, respectively, for packets with destination addresses for endpoints that are associated with the add/drop multiplexer; and an access interface module coupled to the first and second buses that adds and drops traffic to and from the ring network.

2. The add/drop multiplexer of claim 1, wherein the switch fabric comprises a switch fabric which processes asynchronous transfer mode packets.

3. The add/drop multiplexer of claim 1, wherein the access interface module includes a circuit that adapts packets of a first protocol to packets of a second protocol for transmission by the network element.

4. A network element for a virtual path ring network, the network element comprising:

a first ring interface module with a ring input and a ring output;

a second ring interface module with a ring input and a ring output;

a first bus coupled to the first ring interface;

a second bus coupled to the second ring interface;

wherein the first and second ring interface modules each include a switch fabric that passes packets from the ring input of the interface module to its ring output for packets with a destination address for an endpoint associated with another network element;

wherein the switch fabric of the first and second ring interface modules includes a drop-and-continue mechanism to support multi-casting of packets to a number of endpoints on a ring network;

wherein the switch fabrics of the first and second ring interfaces further pass packets from the ring input to the first and second buses, respectively, for packets with destination addresses for endpoints that are associated with the network element; and an access interface module coupled to the first and second buses that adds and drops traffic to and from the ring network.

5. The network element of claim 4, wherein network element comprises an add/drop multiplexer.

6. The network element of claim 4, wherein the switch fabric comprises a switch fabric which processes asynchronous transfer mode packets.

7. The network element of claim 4, wherein the access interface module includes a circuit that adapts packets of a first protocol to packets of a second protocol for transmission by the network element.

8. A method for processing packets in an add/drop multiplexer of a virtual path ring network, the method comprising:

receiving packets from the ring;

reading a destination address of the packet;

looking in a routing table for the destination address read from the packet;

when the destination address corresponds to an endpoint associated with the add/drop multiplexer, switching the packet to a bus of the add/drop multiplexer; and when the destination address corresponds to an endpoint that is not associated with the add/drop multiplexer, switching the packet back out onto the ring.

9. The method of claim 8, wherein the step of reading the destination address comprises reading the destination address from an asynchronous transfer mode packet.

10. The method of claim 8, and further comprising switching the packet to a bus of the add/drop multiplexer and switching the packet back out onto the ring when the packet is a multicast packet with a destination address that corresponds to at least one endpoint that is associated with the add/drop multiplexer and at least one endpoint that is associated with another add/drop multiplexer.

11. The method of claim 8, wherein receiving packets from the ring comprises receiving packets from at least two routes of the ring that transmit the packet around the two routes of the ring.

12. The method of claim 8, wherein receiving packets from the ring comprises receiving packets from at least two routes of the ring that transmit the packet around the ring in generally opposite directions.

13. A method for interconnecting at least two virtual path sub-network rings so that a failure in one sub-network does not cause protection switching in another sub-network, the method comprising:

comparing packets from first and second routes of one sub-network having a number of add-drop multiplexers with a first interconnection module;

selecting packets from one of the first and second routes based on the comparisons; and transmitting the selected packets to another sub-network for transmission on one of the routes of the other sub-network.

14. The method of claim 13, wherein comparing packets from the first and second routes comprises:

dropping and forwarding packets from the first route with a first interconnection module;

dropping packets from the second route with the first interconnection module; and comparing the dropped packets at the first interconnection module.

15. The method of claim 13, and further comprising:

comparing packets from first and second routes of one sub-network at a second interconnection module;

selecting packets from one of the first and second routes based on the comparisons; and transmitting the selected packets to the other sub-network for transmission on the route of the other sub-network that is not coupled to the first interconnection module.

16. The method of claim 13, wherein selecting packets comprises selecting packets based on signal quality.

17. A virtual connection network with a protected ring interconnection between sub-network rings, comprising:

a first sub-network that includes a number of add/drop multiplexers coupled to form a ring including first and second routes for transmitting packets around the sub-network;

at least one additional sub-network that includes a number of network elements coupled to form another ring also including first and second routes for transmitting packets around the at least one additional sub-network;

a first interconnection module associated with the first sub-network that selectively passes packets from one of the first and second routes of the first sub-network to the first route of the at least one additional sub-network and that passes packets from one of the first and second routes of the at least one additional sub-network to the first route of the first sub-network; and a second interconnection module associated with the first sub-network that selectively passes packets from one of the first and second routes of the first sub-network to the second route of the at least one additional sub-network and that passes packets from one of the first and second routes of the at least one additional sub-network to the second route of the first sub-network.

18. A virtual path network, comprising:

a first sub-network that includes a number of add/drop multiplexers coupled to form a ring including first and second routes for transmitting data around the network;

at least one additional sub-network that includes a number of add/drop multiplexers coupled to form another ring also including first and second routes for transmitting data around the network;

a first ring interconnection module that interconnects the first sub-network with one of the routes of the second sub-network; and a second ring interconnection module that interconnects the first sub-network with the other route of the second sub-network.

* * * * *